United States Patent [19]
Short

[11] Patent Number: 5,351,971
[45] Date of Patent: Oct. 4, 1994

[54] BRUSH SEAL DEVICE HAVING A FLOATING BACKPLATE

[75] Inventor: John F. Short, Scituate, R.I.

[73] Assignee: EG&G Sealol, Inc., Cranston, R.I.

[21] Appl. No.: 83,487

[22] Filed: Jun. 30, 1993

Related U.S. Application Data

[63] Continuation-in-part of Ser. No. 64,578, May 21, 1993, abandoned.

[51] Int. Cl.⁵ .............................................. F16J 15/16
[52] U.S. Cl. .......................................... 277/53; 277/54
[58] Field of Search ............. 277/53, 54, 188 R, 174, 277/176; 415/173.5, 174.5

[56] References Cited

U.S. PATENT DOCUMENTS

| | | | |
|---|---|---|---|
| 2,608,425 | 8/1952 | Krug | 277/51 |
| 3,540,745 | 11/1970 | Flock | 277/188 A |
| 5,042,823 | 8/1991 | Mackay et al. | 277/53 |
| 5,106,104 | 4/1992 | Atkinson et al. | 277/53 X |
| 5,174,582 | 12/1992 | Ferguson | 277/53 |
| 5,213,343 | 5/1993 | White, Jr. | 277/152 |

FOREIGN PATENT DOCUMENTS

| | | | |
|---|---|---|---|
| 0453315 | 10/1991 | European Pat. Off. | 277/53 |
| 2005378 | 4/1992 | PCT Int'l Appl. | 277/53 |

*Primary Examiner*—William A. Cuchlinski, Jr.
*Assistant Examiner*—John L. Beres
*Attorney, Agent, or Firm*—Finnegan, Henderson, Farabow, Garrett & Dunner

[57] ABSTRACT

A brush seal device for sealing a high pressure area from a low pressure area. The brush seal device comprises an annular sideplate having a first side facing the high pressure area and a second side opposite the first side, an annular backplate having a first side facing the low pressure area and a second side opposite the first side, and a plurality of bristles between the second side of the sideplate and the second side of the backplate. The backplate is moveable in a radial direction relative to the annular sideplate and the plurality of bristles extend inwardly from an outer peripheral edge of the sideplate. The brush seal device further comprises a retaining washer between the first side of the backplate and the low pressure area, wherein the retaining washer includes a cavity proximate the first side of the backplate, the cavity having an adjustable pressure therein.

14 Claims, 3 Drawing Sheets

5,351,971

BRUSH SEAL DEVICE HAVING A FLOATING BACKPLATE

CROSS REFERENCE TO RELATED APPLICATION

This application is a continuation-in-part of U.S. patent application Ser. No. 08/064,578 filed in the U.S. Patent and Trademark Office on May 21, 1993, now abandoned.

BACKGROUND OF THE INVENTION

1. Field of the Invention

The present invention relates to gas or liquid seals and, more particularly, to brush seals for sealing high pressure areas from low pressure areas.

2. Description of the Related Art

Over the last decade, brush seals have emerged to be a very promising technology for sealing high pressure areas from low pressure areas such as those found in gas turbine engines. Indeed, there is a substantial reduction, e.g., an order of magnitude, in brush seal leakage flow over the present day technology of labyrinth seals, the main disadvantage associated with labyrinth seals being that the clearance of the seal around the shaft tends to increase appreciably over time due to shaft excursions and thermal growth. The resulting increase in parasitic leakage can cause as much as 17 percent loss in power and 7.5 percent increase in specific fuel consumption in the case of engines.

One drawback of current brush seal designs is that the minimum clearance between the backplate and the shaft must be at least great enough to accommodate various transients that the seal is expected to experience. Some of the transients include thermal growth of the shaft, centrifugal growth of the shaft, runout of the shaft, thermal bowing of the shaft on heat-up, shaft movement due to acceleration (turning acceleration), shaft vibration, and eccentricity of the seal housing with respect to the shaft center line.

Seal leakage increases and maximum pressure capability of the seal decreases, however, as the clearance between the shaft and backplate is increased. Thus, seal performance is improved if the seal can be made with a smaller backplate clearance.

SUMMARY OF THE INVENTION

Features and advantages of the invention will be set forth in the description which follows, and in part will be apparent from the description, or may be learned by practice of the invention. The objects and other advantages of the invention will be realized and attained by the apparatus particularly pointed out in the written description, claims and appended drawings.

To achieve these and other advantages and in accordance with the purposes of the invention as embodied and broadly described herein, a brush seal device for sealing a high pressure area from a low pressure area is provided. The brush seal device comprises an annular sideplate having a first side facing the high pressure area and a second side opposite the first side, an annular backplate having a first side facing the low pressure area and a second side opposite the first side, and a plurality of bristles between the second side of the sideplate and the second side of the backplate. The backplate is moveable in a radial direction relative to the annular sideplate and the plurality of bristles extend inwardly from an outer peripheral edge of the sideplate.

In one aspect of the invention, the brush seal device further comprises a retaining washer between the first side of the backplate and the low pressure area. The retaining washer defines a cavity proximate the first side of the backplate, the cavity having a pressure therein.

It is to be understood that both the foregoing general description and the following detailed description are exemplary and explanatory and are intended to provide further explanation of the invention as claimed.

BRIEF DESCRIPTION OF THE DRAWINGS

The accompanying drawings which are included to provide a further understanding of the invention and are incorporated in and constitute a part of the specification, illustrates a preferred embodiment of the invention and together with the description serve to explain the principles of the invention. In the drawings.

DETAILED DESCRIPTION OF THE INVENTION

Figure 1:
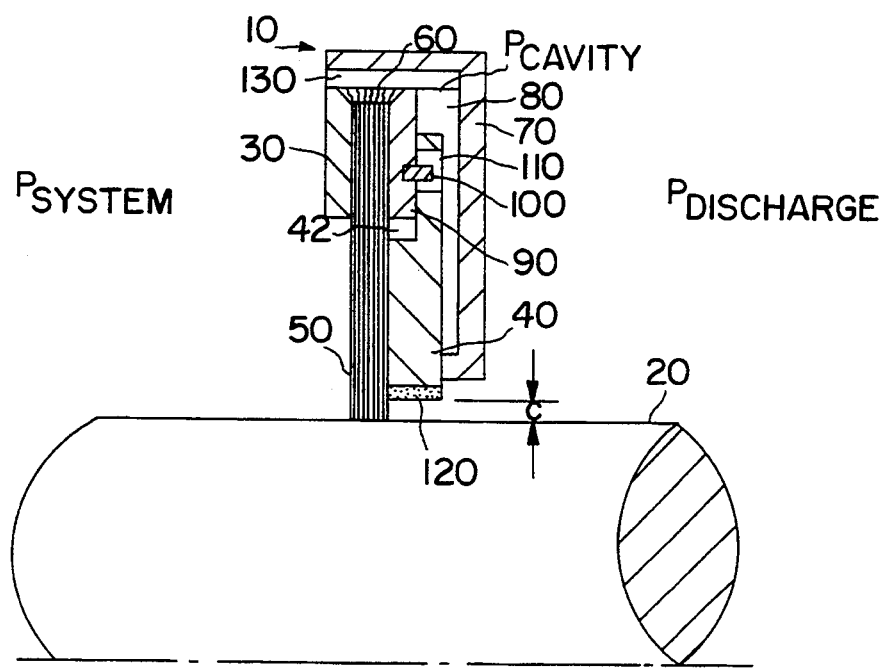
FIG. 1 is a fragmentary side view of one side of a shaft and a radial cross-section of a brush seal device in accordance with an embodiment of the present invention.

Reference will now be made in detail to the presently preferred embodiments of the invention.

As embodied herein, a brush seal device 10 is provided for inhibiting the flow of a gas (or liquid) in a stream along a shaft 20. The gas (or liquid) is sealed, for example, within a machine housing (not shown) and has a system pressure of $P_{system}$. The area outside of the sealed machine housing toward which the sealed gas will tend to leak has a discharge pressure $P_{discharge}$, the system pressure $P_{system}$ being greater than the discharge pressure $P_{discharge}$.

The brush seal device 10 comprises an annular sideplate 30 having a first side facing the system pressure $P_{system}$ and a second side opposite the first side, and an annular backplate 40 having a first side facing the discharge pressure $P_{discharge}$ and a second side opposite the first side. While the sideplate 30 is preferably fixed to the machine housing (not shown), as will be explained below, the backplate 40 is moveable in a radial direction relative to the sideplate 30.

Preferably, both the sideplate 30 and the backplate 40 comprise materials that have a high yield strength at high temperatures. For example, the sideplate 30 and the backplate 40 can comprise a nickel based alloy such as Inconel ® manufactured by Inco Alloys International. It is contemplated that the composition of the sideplate 30 and the backplate 40 can be varied depending on the particular application with which the brush seal device 10 is to be used.

The brush seal device 10 further comprises a plurality of bristles 50 between the second side of the sideplate 30 and the second side of the backplate 40. In particular, the bristles 50 are preferably sandwiched between a squeeze plate 90, the squeeze plate 90 being between the second side of the backplate 40 and the plurality of bristles 50 and preferably fixed to the machine housing (not shown), and the sideplate 30. The squeeze plate 90 can comprise the same material as the sideplate 30 and the backplate 40. The bristles 50 can be secured between the second side of the sideplate 30 and the squeeze plate 90 by, for example, a weld 60 or other means known in the art, depending on the materials used for the sideplate 30, the squeeze plate 90, the bristles 50, and the housing (not shown).

The bristles 50 extend inwardly from an outer peripheral edge of the sideplate 30 such that their free ends run against the shaft 20 to thereby seal the system pressure $P_{system}$ from the discharge pressure $P_{discharge}$ along the shaft 20. Further, the bristles 50 are preferably angled relative to respective radii of the sideplate 30 and the squeeze plate 90 so as to have a circumferential component of direction relative to a direction of rotation of the shaft 20.

To retain their shape, especially at higher temperatures, the bristles 50 preferably comprise a high temperature nickel based alloy such as Haynes 25 ® manufactured by Haynes International. It is contemplated, however, that the bristles 50 can comprise other materials to a suit a particular application.

Typical dimensions of the bristles 50 include bristle diameters of about 0.0028–0.0008 inch, and bristle free lengths of about 0.200–0.700 inch. Further, the plurality of bristles 50 can be arranged into about 10–26 rows between the second side of the sideplate 30 and the second side of the backplate 40 with a pack width of about 0.020–0.040 inch. Again, it is contemplated that the dimensions and configuration of the bristles 50 can be varied to a suit a particular application.

Referring to FIG. 1, there is preferably a clearance c between the inner peripheral edge of the backplate 40 and the shaft 20 to accommodate centrifugal and thermal growth of the shaft. To reduce friction between the backplate 40 and the shaft 20 should they come in contact, a nonabrasive coating 120 having a low friction coefficient, such as, for example, a TFE, graphite, carbon, or chrome carbide coating, can be deposited on the inner peripheral edge of the backplate 40. Alternatively, the backplate 40 and/or shaft 20 can be formed of a nonabrasive material having a low friction coefficient.

Figure 2:
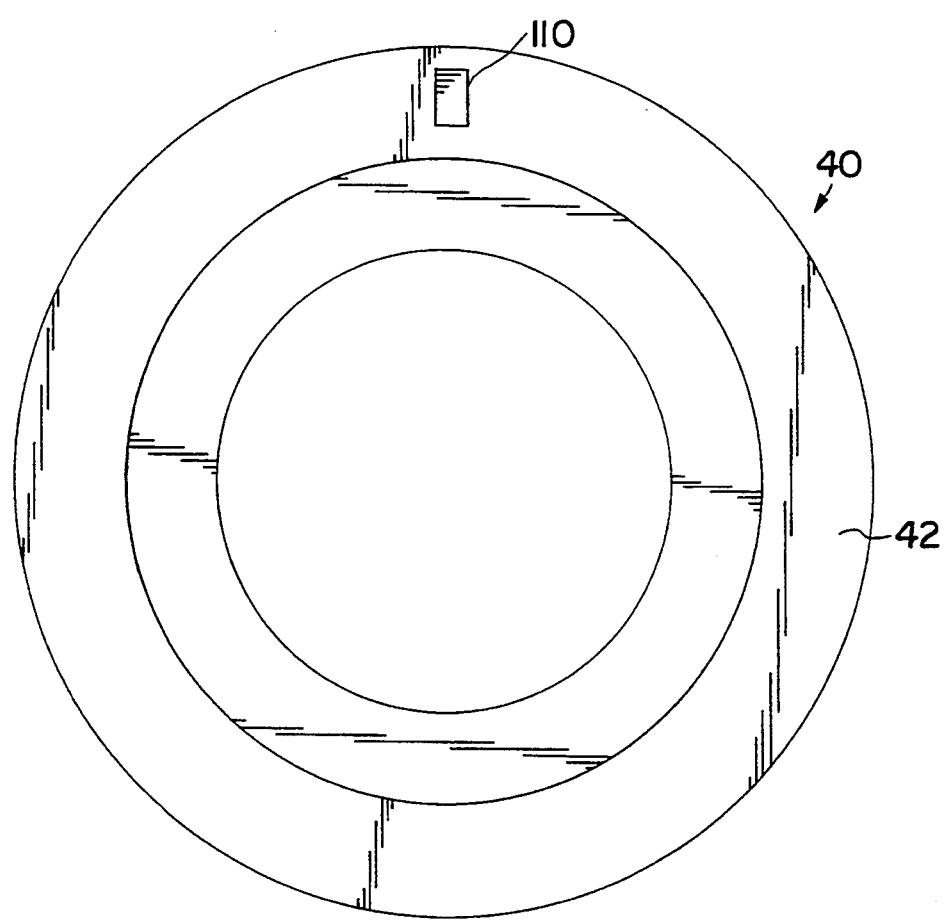
FIG. 2 is a frontal view of the backplate of the brush seal device of FIG. 1.

To respond to radial transients of the shaft 20, the backplate 40 is moveable in a radial direction relative to the sideplate 30. To facilitate such radial movement, the backplate 40 is preferably provided with a recess 42 as shown in FIGS. 1 and 2, wherein the squeeze plate 90 is in sliding engagement with the recess 42. Preferably, the dimensions of the recess 42 are such that the backplate 40 can respond to radial transients of the shaft 20 caused by such factors as runout and thermal bowing of the shaft 20, movement of the shaft 20 due to turning acceleration, shaft vibration, and eccentricity of the seal housing with respect to the center line of the shaft 20. It is contemplated that radial transients of at least 0.030 inches can be accommodated by the present invention.

To inhibit rotational movement of the backplate 40, the brush seal device 10 is provided with an anti-rotational member. As shown in FIGS. 1 and 2 by way of example and not limitation, this anti-rotational member is represented by an anti-rotation pin 100. A recess 110 is formed in the second side of the backplate 40 and the anti-rotation pin 100 is in sliding engagement with the recess 110.

Preferably, the anti-rotation pin 100 comprises the same material as the squeeze plate 90 and is secured to the squeeze plate 90 by means known in the art. Alternatively, the anti-rotation pin 100 and squeeze plate 90 can be formed from a single piece of material. It is contemplated that the shape and configuration of both the anti-rotation pin 100 and the recess 110 can be varied while still inhibiting rotation and allowing radial movement of the backplate 40.

Figure 3:
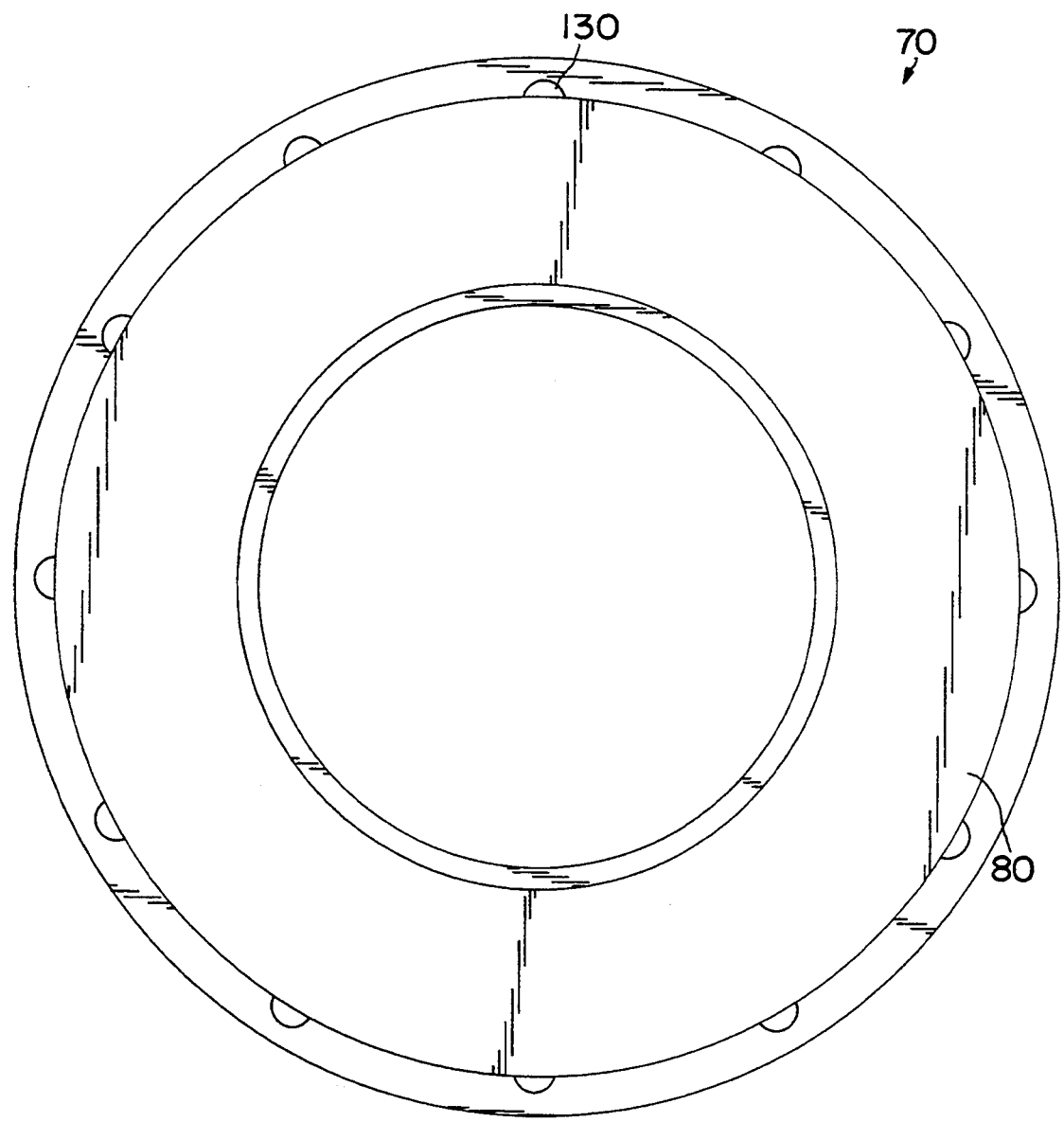
FIG. 3 is a front view of the washer of the brush seal device of FIG. 1.

As shown in FIGS. 1 and 3, the brush seal device 10 further comprises a retaining washer 70 between the first side of the backplate 40 and the discharge pressure $P_{discharge}$. The retaining washer 70 is also preferably fixed to the machine housing (not shown). To reduce friction between the backplate 40 and the retaining washer 70, the retaining washer 70 is provided with a recess 80 formed therein to define a cavity proximate the first side of the backplate 40. The cavity has a pressure $P_{cavity}$ therein.

Preferably, the cavity pressure $P_{cavity}$ is equal to about the system pressure $P_{system}$ such that there is a small net force in the direction of the retaining washer 70. The cavity pressure $P_{cavity}$ can be fine tuned, i.e., either raised or lowered, as required by the use of one or more through ports. For example, as shown in FIG. 1, the brush seal device 10 is provided with a plurality of through ports 130 in communication with the cavity recess 80 and the system pressure $P_{system}$.

Figure 4:
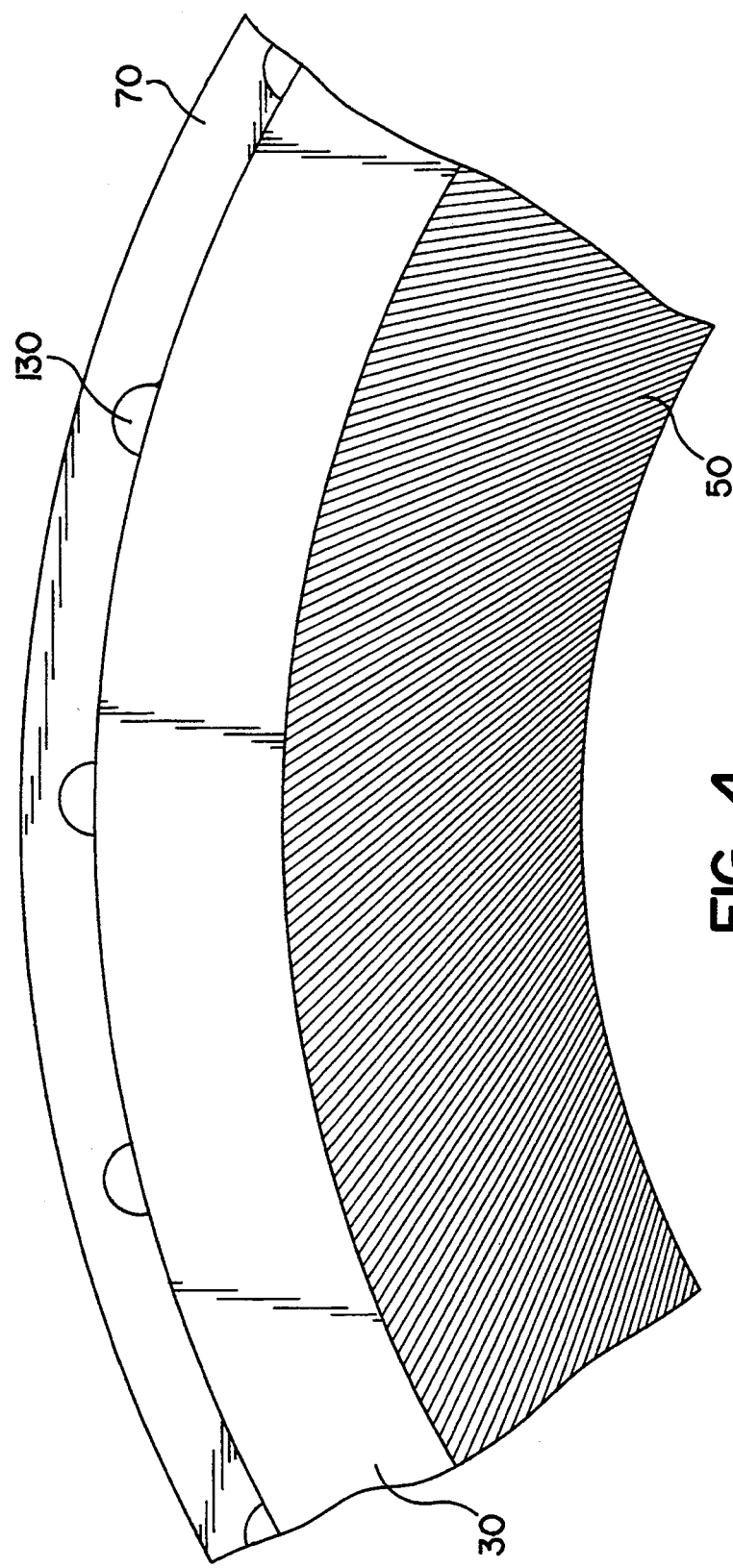
FIG. 4 is an end view of the brush seal device of FIG. 1 from the discharge pressure side.

With reference to FIG. 1, the brush seal device 10 is preferably assembled by squeezing the bristles 50 between the sideplate 30 and the squeeze plate 90. The bristles 50, sideplate 30 and squeeze plate 90 are then welded at weld 60 and the outside diameter of the subassembly is finished ground to a desired diameter. Assembly of the complete brush seal device 10 can be accomplished by placing the backplate 40 on the anti-rotation pin 100 and pressing the subassembly into the inside diameter of the retaining washer 70. The retaining washer 70 can be held in place either by the press fit, or a weld at the seam formed by the interface of the retaining washer 70 and the backplate 40, between the through ports 130. FIG. 4 shows this interface. It is contemplated that the foregoing process for assembling the brush seal device 10 is not meant to be limiting and is shown only as an example.

While the present invention has been described with reference to a preferred embodiment thereof, additional advantages and modifications of the present invention will readily occur to those skilled in the art. Therefore, the invention in its broader aspects is not limited to the specific details, representative devices, and illustrative examples shown and described. Accordingly, departures may be made from such details without departing from the spirit or scope of the general inventive concept as defined by the appended claims and their equivalents.

What is claimed is:

1. A brush seal device for sealing a high pressure area from a low pressure area, the brush seal device comprising:

an annular sideplate having a first side facing the high pressure area and a second side opposite the first side;

an annular backplate having a first side facing the low pressure area and a second side opposite the first side, the backplate being moveable in a radial direction relative to the annular sideplate; and a plurality of bristles between the second side of the sideplate and the second side of the backplate, the plurality of bristles extending inwardly from an outer peripheral edge of the sideplate.

2. The brush seal device of claim 1, further comprising a retaining washer between the first side of the backplate and the low pressure area.

3. The brush seal device of claim 2, wherein the retaining washer defines a cavity proximate the first side of the backplate, the cavity having a pressure therein.

4. The brush seal device of claim 3, wherein the pressure within the cavity is equal to about a pressure of the high pressure area.

5. The brush seal device of claim 3, further comprising one or more through ports in communication with the cavity and the high pressure area for adjusting the pressure within the cavity.

6. The brush seal device of claim 1, further comprising an anti-rotation member for inhibiting rotational movement of the backplate.

7. The brush seal device of claim 6, wherein the second side of the backplate includes a recess formed therein, and wherein the anti-rotation member includes an anti-rotation pin in sliding engagement with the recess.

8. The brush seal device of claim 1, further comprising a nonabrasive coating deposited on an inner peripheral edge of the backplate.

9. The brush seal device of claim 1, wherein the backplate is formed of a nonabrasive material.

10. The brush seal device of claim 1, wherein each of the plurality of bristles has a diameter of about 0.0028–0.0008 inch, the plurality of bristles being arranged into about 10–26 rows between the second side of the sideplate and the second side of the backplate with a pack width of the plurality of bristles being about 0.020–0.040 inch.

11. The brush seal device of claim 1, wherein each of the plurality of bristles has a free length of about 0.200–0.700 inch.

12. The brush seal device of claim 1, further comprising a squeeze plate between the second side of the backplate and the plurality of bristles.

13. An apparatus having a high pressure area and a low pressure area, the apparatus comprising:
  a rotatable shaft; and
  a brush seal device for sealing the high pressure area from the low pressure area along the rotatable shaft, the brush seal device including
    an annular sideplate having a first side facing the high pressure area and a second side opposite the first side,
    an annular backplate having a first side facing the low pressure area and a second side opposite the first side, the backplate being moveable in a radial direction relative to the annular sideplate, and
    a plurality of bristles between the second side of the sideplate and the second side of the backplate, the plurality of bristles extending inwardly from an outer peripheral edge of the sideplate.

14. The apparatus of claim 13, wherein the brush seal device further includes a retaining washer between the first side of the backplate and the low pressure area, the retaining washer defining a cavity proximate the first side of the backplate, the cavity having a pressure therein.

* * * * *